(12) United States Patent
Du et al.

(10) Patent No.: US 11,387,447 B2
(45) Date of Patent: Jul. 12, 2022

(54) SILICON NEGATIVE ELECTRODE SHEET, MANUFACTURING METHOD THEREOF AND LITHIUM ION BATTERY

(71) Applicant: BEIJING XIAOMI MOBILE SOFTWARE CO., LTD., Beijing (CN)

(72) Inventors: Sihong Du, Beijing (CN); Zongqiang Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 302 days.

(21) Appl. No.: 16/745,551

(22) Filed: Jan. 17, 2020

(65) Prior Publication Data

US 2021/0091378 A1    Mar. 25, 2021

(30) Foreign Application Priority Data

Sep. 23, 2019 (CN) .................. 201910898475.X

(51) Int. Cl.
*H01M 4/36* (2006.01)
*H01M 4/04* (2006.01)
*H01M 4/133* (2010.01)
*H01M 4/134* (2010.01)
*H01M 4/1393* (2010.01)
(Continued)

(52) U.S. Cl.
CPC .......... *H01M 4/366* (2013.01); *H01M 4/043* (2013.01); *H01M 4/0404* (2013.01); *H01M 4/133* (2013.01); *H01M 4/134* (2013.01); *H01M 4/1393* (2013.01); *H01M 4/1395* (2013.01); *H01M 4/386* (2013.01); *H01M 4/587* (2013.01); *H01M 10/0525* (2013.01); *H01M 2004/021* (2013.01); *H01M 2004/027* (2013.01)

(58) Field of Classification Search
CPC .... H01M 4/1395; H01M 4/134; H01M 4/386; H01M 4/366; H01M 4/0404; H01M 4/1393; H01M 4/043; H01M 4/133; H01M 4/587; H01M 10/0525; H01M 2004/021; H01M 2004/027
See application file for complete search history.

(56) References Cited

U.S. PATENT DOCUMENTS

2015/0280221 A1* 10/2015 Abdelsalam ............ H01M 4/64
                                                              429/217
2021/0218019 A1*  7/2021 Tamura ................. H01M 4/134

FOREIGN PATENT DOCUMENTS

CN    101847708 A    9/2010
CN    105742613 A    7/2016
(Continued)

OTHER PUBLICATIONS

Machine translation of specification of CN101847708A (Year: 2009).*

(Continued)

*Primary Examiner* — William E McClain
*Assistant Examiner* — Jason Barton
(74) *Attorney, Agent, or Firm* — Syncoda LLC; Feng Ma

(57) ABSTRACT

A silicon negative electrode sheet includes: a current collector; and at least two active coatings containing negative active materials, which are sequentially coated on the current collector. Through holes are formed on the active coating along the thickness direction and are arranged at intervals. The liquid holding capacity of the silicon negative electrode sheet and the charging capacity of a silicon negative electrode can be improved.

18 Claims, 3 Drawing Sheets

(51) Int. Cl.
*H01M 4/1395* (2010.01)
*H01M 4/38* (2006.01)
*H01M 4/587* (2010.01)
*H01M 10/0525* (2010.01)
*H01M 4/02* (2006.01)

(56) References Cited

FOREIGN PATENT DOCUMENTS

| | | |
|---|---|---|
| CN | 108550857 A | 9/2018 |
| WO | 2013159471 A1 | 10/2013 |

OTHER PUBLICATIONS

Machine translation of specification of CN108550857A (Year: 2018).*
Machine translation of specification of CN105742613A (Year: 2016).*
Extended European Search Report in Application No. 20162317, dated Sep. 30, 2020.
CN First Office Action in Application No. 201910898475.X, dated Aug. 17, 2021.

* cited by examiner

SILICON NEGATIVE ELECTRODE SHEET, MANUFACTURING METHOD THEREOF AND LITHIUM ION BATTERY

CROSS-REFERENCE TO RELATED APPLICATION

This application claims priority to Chinese Patent Application No. 201910898475.X filed on Sep. 23, 2019, the disclosure of which is hereby incorporated by reference in its entirety.

BACKGROUND

With the rapid development of industries of electric vehicles and consumer goods, the demand for long battery life is more and more urgent. The battery life is closely related to the energy density of batteries. Silicon negative electrode lithium ion batteries, which have significant advantages in energy density improvement, are widely used.

SUMMARY

According to one aspect of embodiments of the present disclosure, there is provided a silicon negative electrode sheet, comprising: a current collector; and at least two active coatings containing negative active materials sequentially coated on the current collector; wherein through holes are formed along the thickness direction and are arranged at intervals on the active coatings.

According to another aspect of embodiments of the present disclosure, there is provided a method for manufacturing a silicon negative electrode sheet, comprising: sequentially coating at least two active coatings containing negative active materials on a current collector; and forming through holes along thickness direction of the at least two active coatings and arranged at intervals, thereby obtaining the negative electrode sheet for a lithium ion battery.

According to still another aspect of embodiments of the present disclosure, there is provided a lithium ion battery, comprising any foregoing silicon negative electrode sheet.

It should be understood that the above general description and the following detailed description are exemplary and explanatory, and should not limit the present disclosure.

BRIEF DESCRIPTION OF THE DRAWINGS

The accompanying drawings, which are incorporated in and constitute a part of this disclosure, illustrate embodiments consistent with the present disclosure and, together with the disclosure, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Various embodiments of the present disclosure can address that the charging capacity of silicon negative electrode lithium ion batteries needs to be further improved.

Figure 1:
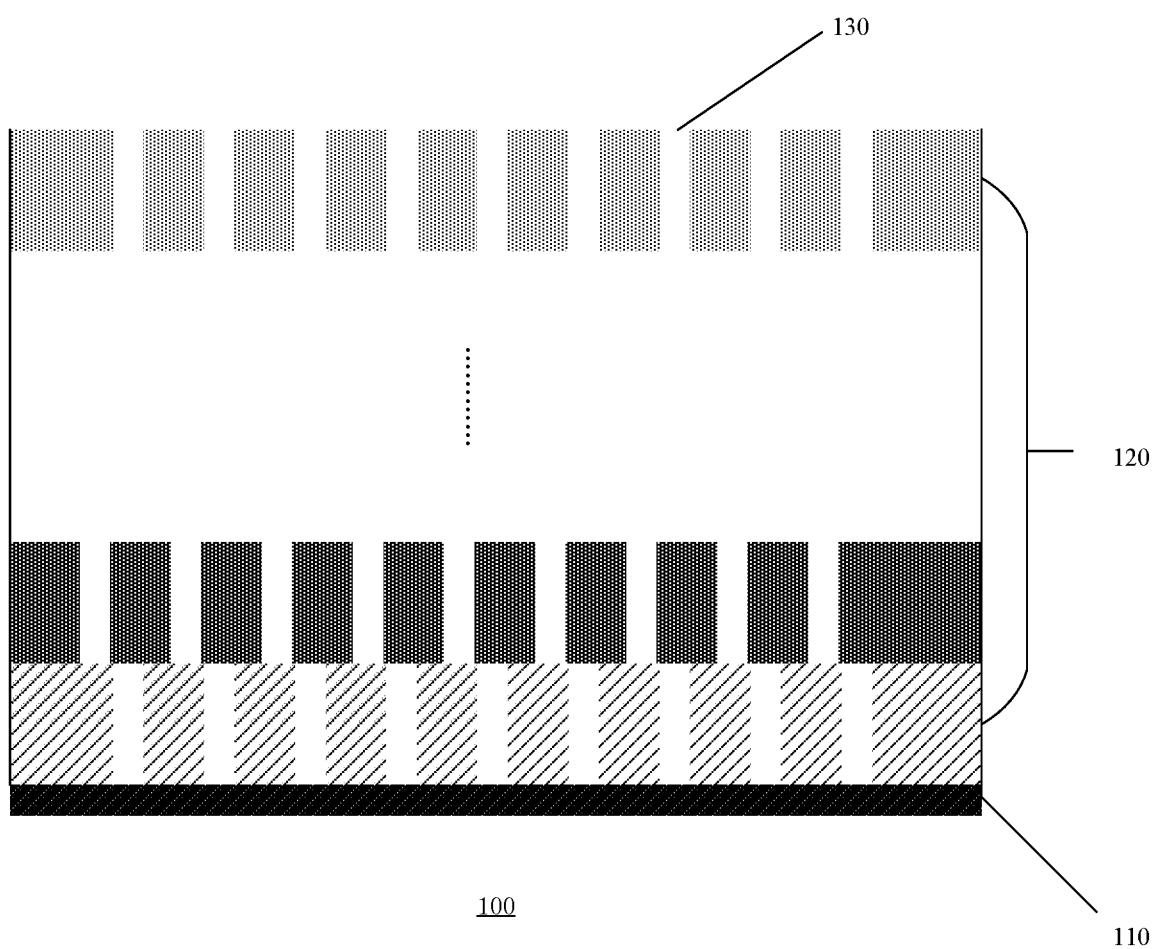
FIG. 1 is a structural view illustrating a silicon negative electrode sheet according to some embodiments of the present disclosure.

FIG. 1 is a structural view illustrating a silicon negative electrode sheet according to some embodiments of the present disclosure. Referring to FIG. 1, the silicon negative electrode sheet 100 includes: a current collector 110 and active coatings 120. In FIG. 1, the silicon negative electrode sheet 100 includes n layers of active coatings 120, in which n≥2. In other words, the number of the active coatings 120 in the present disclosure is at least two layers. In the present disclosure, the active coating 120 contains negative active materials. Through holes 130 are formed on the active coating 120 and run through along a thickness direction of the active coatings 120. A plurality of through holes 130 may be provided on each active coating 120 and arranged at intervals.

Figure 2:
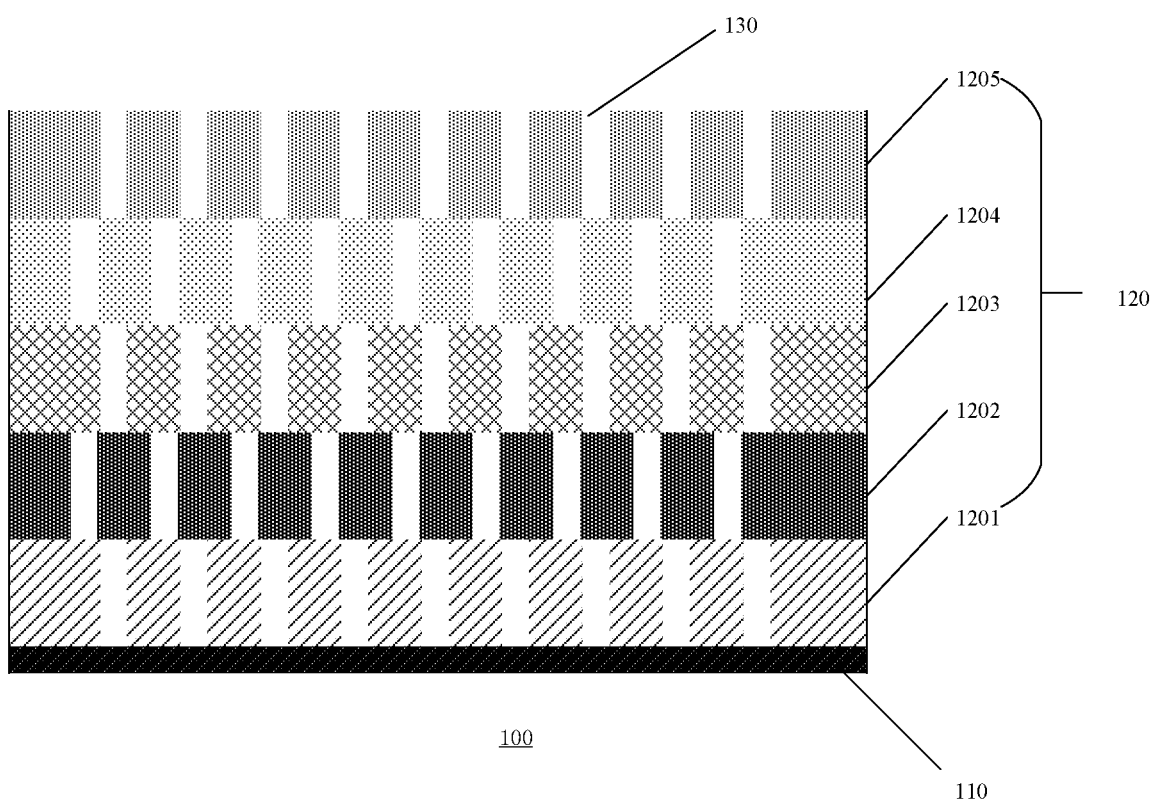
FIG. 2 is a structural view illustrating a silicon negative electrode sheet according to some embodiments of the present disclosure.

In some embodiments of the present disclosure, the layer number of the active coatings 120 is less than or equal to 5 to avoid too thick silicon negative electrode sheet from affecting a positive electrode sheet. Some embodiments of the present disclosure take an example that five layers of the active coatings 120 are provided. FIG. 2 is a structural view illustrating a silicon negative electrode sheet according to some embodiments of the present disclosure. Referring to FIG. 2, the active coatings 120 include an active coating 1201, an active coating 1202, an active coating 1203, an active coating 1204 and an active coating 1205.

It is to be understood that the layer number of the active coatings 120 in the present disclosure may be set according to actual demands on the premise of not affecting the positive electrode sheet, and the layer number of the active coatings 120 is not limited in the present disclosure.

The current collector 110 may be copper foil, for example, electrolytic copper foil with the thickness of 7-15 μm. The active coating 1201, the active coating 1202, the active coating 1203, the active coating 1204 and the active coating 1205 of the active coatings 120 are sequentially coated on the current collector 110. The active coating 1201 is coated on a surface of the current collector 110, and the active coating 1202 is coated on the active coating 1201. The active coating 1203, the active coating 1204 and the active coating 1205 are formed in a similar manner to that of the above active coating 1202, so no further description will be given herein.

Figure 3:
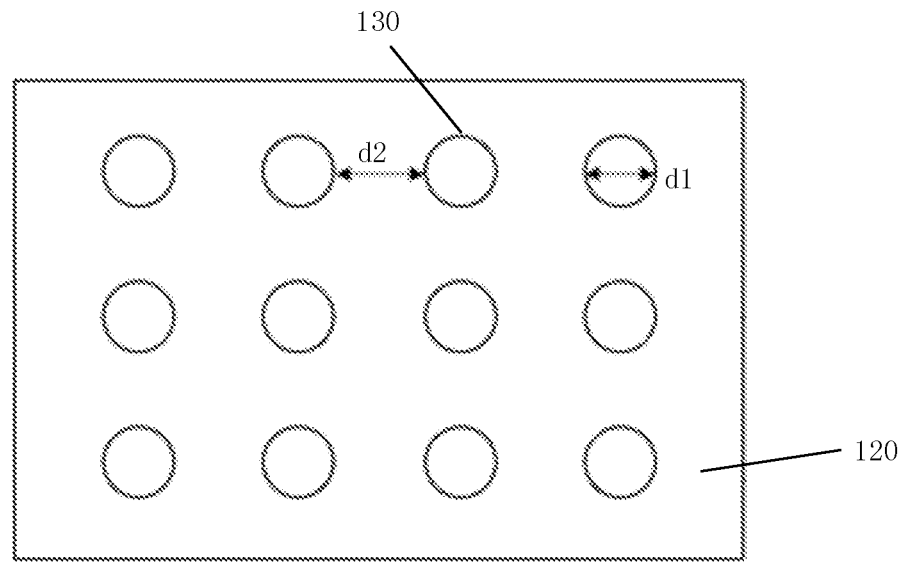
FIG. 3 is a plan view illustrating through holes formed in active coatings of the silicon negative electrode sheet according to some embodiments of the present disclosure.

FIG. 3 is a plan view illustrating through holes formed in active coatings of the silicon negative electrode sheet according to the exemplary embodiment of the present disclosure. Referring to FIG. 3, through holes 130 are formed on the active coatings 120 and run through along the thickness direction of the active coatings 120. That is, the depth of the through hole 130 is equal to the thickness of the active coating 120.

The through holes 130 may be multiple and are arranged at intervals. For instance, the plurality of through holes 130 may be regularly arranged, for example, in a matrix or multiple concentric circles form, or be irregularly arranged. The shape of the through hole 130 in a cross-section in a direction perpendicular to the thickness of the active coating may be circular, square, rectangular, or other polygons, or may also be irregular shape. The cross-sectional shape of the through hole 130 in the direction perpendicular to the thickness of the active coating is not limited in the present disclosure.

For instance, in the cross section perpendicular to the thickness of the active coating, the shape of the through hole 130 is circular, wherein the aperture d1 may be 2-15 μm, and the pitch d2 may be 50-100 μm. It is to be understood that the aperture d1 and the pitch d2 of the through hole 130 are not limited in the present disclosure.

In various embodiments of the present disclosure, due to the through holes arranged at intervals in the at least two active coatings of the silicon negative electrode sheet, the porosity of the silicon negative electrode sheet is improved, which facilitates the storage of electrolyte, effectively improves the liquid holding capacity of the silicon negative electrode sheet, reduces the ion transmission distance during charging and discharging, forms gaps between silicon material particles of the silicon negative electrode sheet, provides a buffer space for the cyclic expansion inside the silicon particles, and improves the charging capacity of the silicon negative electrode.

Referring to FIGS. 2 and 3, the through holes 130 in adjacent active coatings 120 are arranged in a staggered form. The through holes of the active coating 1201 and the through holes of the active coating 1202 are arranged in a staggered form. That is, the plurality of through holes 130 of the active coating 1201 do not overlap the plurality of through holes 130 of the active coating 1202 in a horizontal plan view.

For instance, the staggered distance d between each through hole 130 in the active coating 1201 and each through hole 130 of the active coating 1202 is 4-20 μm.

The staggered arrangement of through holes 130 in adjacent active coatings 120 facilitates the storage and transmission of electrolyte in the through holes 130, reduces the operation of forming holes in the plurality of active coatings 120, and prevents the upper active coating 120 from affecting the through holes 130 on the lower active coating 120.

In some embodiments of the present disclosure, the negative active materials contain silicon materials. Herein, the silicon material may be one of silicon alloy, silicon-carbon composite materials and silicon oxide or any combination thereof. In the active coatings 120, the silicon content of active coatings close to the current collector 110 is higher than the silicon content of active coatings 120 away from the current collector 110. In other words, when the layer number of the active coatings 120 is N, N is greater than or equal to 2, the silicon content in the (N−1)-th active coating 120 is higher than the silicon content in the Nth active coating 120.

In the present disclosure, among the active coatings 120, as the silicon content of the active coating 120 close to the current collector 110 is higher than the silicon content of the active coating 120 away from the current collector 110, on the premise that the silicon content in the negative active materials is constant, silicon is gathered in high content in the active coating 120 near the current collector 110. Thus, the current density distribution on one side close to the current collector 110 is more uniform, and the negative active materials may be charged and discharged uniformly to ensure the uniform distribution of the internal expansion force of the silicon negative electrode sheet 100.

In some embodiments of the present disclosure, in order to reduce the probability that the active coating is detached from the current collector due to the fracture between and within the silicon particles affected by the volume expansion effect, the mass content of silicon in the active coatings is controlled within a certain range. For instance, the mass content of silicon in the negative active materials of the first active coating is controlled within a range of 20%-50%; the mass content of silicon in the negative active materials of the second active coating is controlled within a range of 15%-40%; the mass content of silicon in the negative active materials of the third active coating is controlled within a range of 10%-30%; the mass content of silicon in the negative active materials of the fourth active coating is controlled within a range of 5%-20%; and the mass content of silicon in the negative active materials of the fifth active coating is controlled within a range of 0-5%.

In some embodiments of the present disclosure, the negative active materials also contain graphite materials. The graphite materials may be natural graphite or electrographite. As graphite has the advantages of high electronic conductivity, large lithium ion diffusion coefficient, small volume change of the laminated structure before and after lithium intercalation, high lithium intercalation capacity, and low lithium intercalation potential, the conductivity of the current collector can be improved. As the graphite materials with the silicon materials is taken as the negative active materials, the graphite mesh structure has the function of fixing the silicon particles, thereby reducing the volume expansion of the silicon materials, and improving the conductivity of the silicon negative electrode sheet.

In such embodiments, high power type graphite materials or energy compatible power type graphite materials may be selected as the graphite materials contained in the negative active materials. The type of the graphite contained in different active coatings 120 in the at least two active coatings 120 may be same or different. Herein, the granularity index of different types of the graphite materials is different, and the compacting density of the silicon negative electrode sheet 100 is also different.

For instance, as for the active coatings 120 of the silicon negative electrode sheet 100 as shown in FIG. 2, high power type graphite may be selected as the active coating 1201 and the active coating 1202. The granularity index of the graphite materials is D10≤5 μm, D50≤10 μm, D90≤25 μm, and the compacting density of the silicon negative electrode sheet 100 is controlled within a range of 1.65-1.70 g/cm$^3$. Energy compatible power type graphite may select as the active coating 1203. The granularity index of the graphite materials is D10≤10 μm, D50≤20 μm, D90≤30 μm, and the compacting density of the silicon negative electrode sheet 100 is controlled within a range of 1.68-1.75 g/cm$^3$.

The maximum thickness of the active coating 120 is determined according to the granularity index of the graphite materials contained in the active coating. The granularity index of the graphite materials may be determined by particle diameter. For instance, the particle diameter of the graphite materials in the present disclosure may be D99. Herein, D represents the diameter of the graphite particles, and D99 indicates that 99% particle diameter is below a certain value. In one example of the present disclosure, the granularity index of the graphite materials is determined by the particle diameter D99, and the thickness of the active coating is 20-90 μm.

In some embodiments of the present disclosure, the active coating 120 is made from active slurry. The active slurry includes solute and solvent that are compatible with each other, and both of them are uniformly mixed to form the active slurry. The solute in the active slurry is prepared by mixing a conductive agent, a bonding agent, a thickener and negative active materials. The conductive agent is used for improving the conductivity of the negative active materials. The bonding agent is an inactive substance and used for bonding the active coating and the current collector and fixing the active coating on a surface of the current collector. The thickener is used for improving the consistency of the active slurry and maintaining the stability of the active slurry. The solvent may be one or more of N, N-dimethylformamide (DMF), N, N-dimethylacetamide (DMAc), N-2-methylpyrrolidone (NMP), acetone, tetrahydrofuran (THF), and methanol.

Herein, in the active coating with high silicon content among the active coatings 120, the mass content of the bonding agent in the active slurry is high. The conductive agent may be one or more of carbon nanotube, graphite, vapor-grown carbon fiber (VGCF) and the like or any combination thereof. The bonding agent may be one or more of sodium polyacrylate and its improvements, styrene-butadiene rubber, nitrile rubber, butadiene rubber, and modified styrene-butadiene rubber or any combination thereof. The thickener adopts the conventional sodium carboxymethyl cellulose (CMC-Na).

In some embodiments of the present disclosure, the mass content of the bonding agent in the active slurry of the active coating with high silicon content is higher than the mass content of the bonding agent in the active slurry of the active coating with low silicon content. In the active coating with high silicon content, in order to further inhibit the expansion among silicon material particles, the content of the bonding agent is correspondingly increased, so as to further improve the stability of the silicon negative electrode sheet and improve the conductivity of the silicon negative electrode sheet.

For instance, when the layer number of the at least two active coatings is five, silicon and graphite are mixed as the negative active materials, and the mass ratio of solid ingredients of the negative active materials, the conductive agent, the bonding agent and the thickener in the active coatings may be as follows:

In the first active coating, the mass ratio of the negative active materials, the conductive agent, the bonding agent and the thickener is 92.5%-96.7%:0.8%-2%:2%-4%:0.5%-1.5%.

In the second active coating, the mass ratio of the negative active materials, the conductive agent, the bonding agent and the thickener is 92.5%-95.7%:2%-3%:1.5%-3%:0.8%-1.5%.

In the third active coating, the mass ratio of the negative active materials, the conductive agent, the bonding agent and the thickener is 93%-96%:2%-3%:1%-2.5%:1%-1.5%.

In the fourth active coating, the mass ratio of the negative active materials, the conductive agent, the bonding agent and the thickener is 93.5%-95.8%:2%-3%:1%-2%:1.2%-1.5%.

In the fifth active coating, the mass ratio of the negative active materials, the conductive agent, the bonding agent and the thickener is 94-96%:2%-3%:1%-1.5%:1%-1.5%.

Figure 4:
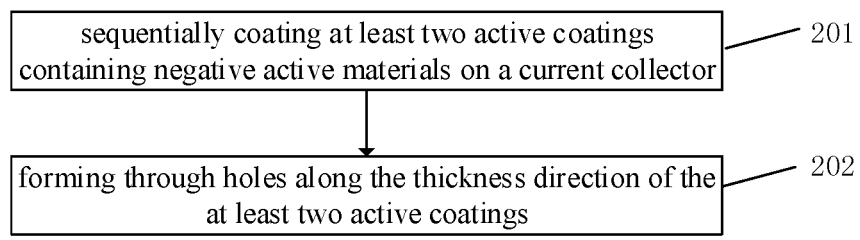
FIG. 4 is a schematic diagram illustrating a method for manufacturing a silicon negative electrode sheet according to some embodiments of the present disclosure.

FIG. 4 is a schematic diagram illustrating a method for manufacturing a silicon negative electrode sheet according to some embodiments of the present disclosure. Referring to FIG. 4, the method for manufacturing the silicon negative electrode sheet includes:

Step S201: sequentially coating at least two active coatings containing negative active materials on a current collector; and Step S202: forming through holes along a thickness direction of the at least two active coatings, in which the through holes are arranged at intervals, so that the negative electrode sheet is obtained.

A layer of active coating containing negative active materials is coated on a surface of the current collector by electrode sheet coating technology, and is then compacted to form the first active coating. The first active coating provided with through holes is obtained by forming the through holes along the thickness direction of the first active coating by mechanical means or laser.

A layer of active coating containing negative active materials is continuously coated on a surface of the first active coating, and is then compacted to form the second active coating. The second active coating provided with through holes is obtained by forming the through holes along the thickness direction of the second active coating by mechanical means or laser.

The above operation is adopted until the required layers of active coatings are obtained.

In some embodiments of the present disclosure, the layer number N of the active coatings is less than or equal to 5, and N should not be too large. As the layer number of the active coatings is larger, the thickness of the negative electrode sheet is increased, thereby affecting the chemical performance of the positive electrode sheet.

In some embodiments of the present disclosure, the through holes of adjacent active coatings are arranged in a staggered form.

In some embodiments of the present disclosure, the adjacent active coatings with through holes arranged in a staggered form may be prepared by the following steps: coating a layer of active coating containing negative active materials on the surface of the current collector by electrode sheet coating technology, and compacting the active coating so as to form the first active coating; and forming through holes along the thickness direction of the first active coating by mechanical means or laser so as to form the first active coating provided with the through holes.

A layer of active coating containing negative active materials is continuously coated on a surface of the first active coating, and is then compacted to form the second active coating. Through holes are formed along the thickness direction of the second active coating by mechanical means or laser, and the through holes of the second active coating and the first active coating are arranged in a staggered form by setting aperture distribution spacing of the through holes in the second active coating different from that of the through holes in the first active coating. For example, the misaligned distance d between the plurality of through holes of the first active coating and the plurality of through holes of the second active coating is 4-20 μm. In this way, the second active coating provided with the through holes is obtained.

In some embodiments of the present disclosure, the negative active materials contain silicon materials, and among the active coatings, the silicon content of the active coating close to the current collector is higher than the silicon content of the active coating away from the current collector.

On the premise that the silicon content in the negative active materials is constant, silicon is gathered in high content in the active coating near the current collector. Thus, the current density distribution on one side close to the current collector is more uniform, and the negative active materials may be charged and discharged uniformly to ensure the uniform distribution of the internal expansion force of the silicon negative electrode sheet.

In some embodiments of the present disclosure, the active coating is made from active slurry which contains a conductive agent, a bonding agent, a thickener and negative active materials.

The negative active materials contain silicon materials and also contain graphite materials. The active slurry is uniformly mixed by the conductive agent, the bonding agent, the thickener and the negative active materials.

Figure 5:
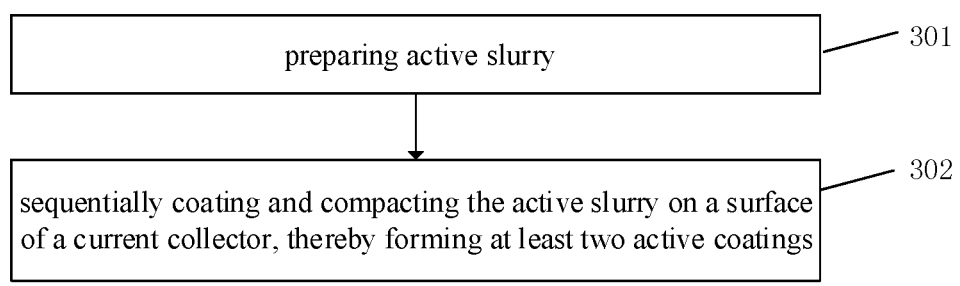
FIG. 5 is a schematic diagram illustrating a method for manufacturing active coatings of the silicon negative electrode sheet according to some embodiments of the present disclosure.

FIG. 5 is a schematic diagram illustrating a method for preparing active coatings of the silicon negative electrode sheet according to the exemplary embodiment of the present disclosure. Referring to FIG. 5, the method for preparing the active coatings includes:

Step S301: preparing active slurry.

The active slurry contains negative active materials, a conductive agent, a bonding agent and a thickener. The negative active materials contain silicon materials. The negative active materials, the thickener, the bonding agent and the conductive agent are mixed to form solid ingredient solute for the active slurry according to the mass ratio of solid ingredients of the negative active materials, the conductive agent, the bonding agent and the thickener in the active coatings mentioned in the embodiment of the present disclosure, and the obtained solid ingredient solute is dispersed and stirred in an organic solvent to prepare the active slurry.

Step S302: sequentially coating and compacting the active slurry on a surface of a current collector, thereby forming at least two active coatings.

The active slurry is coated on the surface of the current collector and then dried and rolled to obtain the active coating. It is to be understood that when multiple layers of the active coatings are provided, the active slurry may be sequentially coated and compacted on the surface of the current collector.

In some embodiments of the present disclosure, there is provided a lithium ion battery, comprising the foregoing silicon negative electrode sheet 100.

Other implementation solutions of the present disclosure will be apparent to those skilled in the art from consideration of the specification and practice of the present disclosure. This disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

It will be understood that when an element such as a layer, region, or other structure is referred to as being "on" or extending "onto" another element, it can be directly on or extend directly onto the other element or intervening elements can also be present. In contrast, when an element is referred to as being "directly on" or extending "directly onto" another element, there are no intervening elements present.

Likewise, it will be understood that when an element such as a layer, region, or substrate is referred to as being "over" or extending "over" another element, it can be directly over or extend directly over the other element or intervening elements can also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Relative terms such as "below" or "above" or "upper" or "lower" or "vertical" or "horizontal" can be used herein to describe a relationship of one element, layer, or region to another element, layer, or region as illustrated in the drawings. It will be understood that these terms and those discussed above are intended to encompass different orientations of the device in addition to the orientation depicted in the drawings.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A silicon negative electrode sheet, comprising:
    a current collector; and
    at least two active coatings containing negative active materials, sequentially coated over the current collector;
    wherein through holes are formed along a thickness direction of the active coatings and are arranged at intervals over the active coatings, and
    the through holes of adjacent active coatings are arranged in a staggered form.

2. The silicon negative electrode sheet of claim 1, wherein the negative active materials contain silicon materials; and among the at least two active coatings, a silicon content of an active coating proximal to the current collector is higher than a silicon content of an active coating distal from the current collector.

3. The silicon negative electrode sheet of claim 1, wherein the negative active materials contain graphite materials.

4. The silicon negative electrode sheet of claim 1, wherein
    the at least two active coatings are made from active slurry containing a conductive agent, a bonding agent, a thickener, and the negative active materials; and
    a mass content of the bonding agent contained in one of the at least two active coatings with high silicon content in the active slurry is higher than a mass content of the bonding agent contained in another one of the at least two active coatings with low silicon content in the active slurry.

5. The silicon negative electrode sheet of claim 1, wherein a number of coatings of the at least two active coatings is less than or equal to 5.

6. The silicon negative electrode sheet of claim 5, wherein the number of coatings of the at least two active coatings is equal to 5;
    a mass content of silicon in the negative active materials in a first active coating is 20%-50%;
    a mass content of silicon in the negative active materials in a second active coating is 15%-40%;
    a mass content of silicon in the negative active materials in a third active coating is 10%-30%;
    a mass content of silicon in the negative active materials in a fourth active coating is 5%-20%; and
    a mass content of silicon in the negative active materials in a fifth active coating is less than 5%.

7. The silicon negative electrode sheet of claim 3, wherein a thickness of each of the at least two active coatings is 20-90 µm.

8. A method of manufacturing the silicon negative electrode sheet of claim 1, the method comprising:
    sequentially coating the at least two active coatings containing the negative active materials over the current collector; and
    forming the through holes along the thickness direction of the at least two active coatings and arranged at intervals, thereby obtaining the silicon negative electrode sheet.

9. The method of claim 8, wherein the negative active materials contain silicon materials; and among the at least two active coatings, a silicon content of an active coating proximal to the current collector is higher than a silicon content of an active coatings distal from the current collector.

10. The method of claim 8, wherein the at least two active coatings are made from active slurry containing a conductive agent, a bonding agent, a thickener, and the negative active materials; and the method further comprises:
    preparing the active slurry containing the negative active materials including the silicon materials; and
    coating and compacting the active slurry over a surface of the current collector, thereby forming the at least two active coatings.

11. The method of claim 8, wherein the silicon negative electrode sheet comprises N active coating layers, where $2 \leq N \leq 5$; the method further comprising:
    coating a first active coating layer of the N active coating layers on a surface of the current collector and then forming first through holes in the first active coating layer coated on the surface of the current collector, the first through holes extending vertically through the first active coating layer;
    coating a second active coating layer of the N active coating layers on the first active coating layer formed with the first through holes and then forming second through holes in the second active coating layer coated on the first active coating layer formed with the first through holes, the second through holes extending vertically through the second active coating layer; and
    repeating the coating a first active coating layer and the coating a second active layer till the silicon negative electrode sheet comprising N active coating layer is obtained.

12. A lithium ion battery, comprising a silicon negative electrode sheet, wherein
    the silicon negative electrode sheet comprises:
    a current collector; and
    at least two active coatings containing negative active materials, sequentially coated over the current collector;
    wherein through holes are formed along a thickness direction of the active coatings and are arranged at intervals over the active coatings, and
    the through holes of adjacent active coatings are arranged in a staggered form.

13. The lithium ion battery of claim 12, wherein the negative active materials contain silicon materials; and among the at least two active coatings, a silicon content of an active coating proximal to the current collector is higher than a silicon content of an active coatings distal from the current collector.

14. The lithium ion battery of claim 12, wherein the negative active materials contain graphite materials.

15. The lithium ion battery of claim 12, wherein the at least two active coatings are made from active slurry containing a conductive agent, a bonding agent, a thickener, and the negative active materials; and
   a mass content of the bonding agent, contained in one of the at least two active coatings with high silicon content, in the active slurry is higher than a mass content of the bonding agent, contained in another one of the at least two active coatings with low silicon content, in the active slurry.

16. The lithium ion battery of claim 12, wherein a number of coatings of the active coatings is less than or equal to 5.

17. The lithium ion battery of claim 16, wherein
   the number of coatings of the active coatings is equal to 5;
   a mass content of silicon in the negative active materials in a first active coating is 20%-50%;
   a mass content of silicon in the negative active materials in a second active coating is 15%-40%;
   a mass content of silicon in the negative active materials in a third active coating is 10%-30%;
   a mass content of silicon in the negative active materials in a fourth active coating is 5%-20%;
   a mass content of silicon in the negative active materials in a fifth active coating is less than 5%; and
   thickness of each active coating is 20-90 µm.

18. A lithium ion battery comprising the silicon negative electrode sheet of claim 1,
   wherein the negative active materials contain graphite materials, and form a graphite mesh structure to fix silicon particles; and
   wherein the through holes formed along the thickness direction of the active coatings are arranged at intervals over the active coatings, thereby facilitating storage of electrolyte, forming gaps between silicon material particles of the silicon negative electrode sheet, and providing a buffer space periodic expansion inside the silicon particles.

* * * * *